US012520098B2

(12) United States Patent
Tanno et al.

(10) Patent No.: US 12,520,098 B2
(45) Date of Patent: Jan. 6, 2026

(54) AUDIO SYSTEM AND IN-VEHICLE SYSTEM

(71) Applicant: ALPS ALPINE CO., LTD., Tokyo (JP)

(72) Inventors: Keita Tanno, Fukushima (JP); Osamu Shinohara, Fukushima (JP)

(73) Assignee: ALPS ALPINE CO., LTD., Tokyo (JP)

(*) Notice: Subject to any disclaimer, the term of this patent is extended or adjusted under 35 U.S.C. 154(b) by 315 days.

(21) Appl. No.: 18/143,164

(22) Filed: May 4, 2023

(65) Prior Publication Data

US 2023/0379651 A1 Nov. 23, 2023

(30) Foreign Application Priority Data

May 18, 2022 (JP) ................................ 2022-081557

(51) Int. Cl.
*H04R 3/12* (2006.01)
*H04S 7/00* (2006.01)

(52) U.S. Cl.
CPC ............... *H04S 7/307* (2013.01); *H04R 3/12* (2013.01); *H04S 7/302* (2013.01); *H04R 2499/13* (2013.01)

(58) Field of Classification Search
CPC .......... H04S 7/302; H04S 7/307; H04R 3/12; H04R 2499/13
See application file for complete search history.

(56) References Cited

U.S. PATENT DOCUMENTS

| | | | | |
|---|---|---|---|---|
| 10,448,180 B1 * | 10/2019 | Helm | ..................... | B60K 35/22 |
| 2006/0002571 A1 * | 1/2006 | Holloway | ................ | H04R 5/02 381/86 |
| 2013/0034246 A1 | 2/2013 | Kano | | |
| 2017/0064452 A1 | 3/2017 | Hartung | | |

FOREIGN PATENT DOCUMENTS

| | | |
|---|---|---|
| JP | 2009 100187 A | 5/2009 |
| JP | 2013-254101 | 12/2013 |

OTHER PUBLICATIONS

Extended European Search Report from EP 23170946.0, Jan. 17, 2024, 31 pp.

* cited by examiner

*Primary Examiner* — James K Mooney
(74) *Attorney, Agent, or Firm* — Crowell & Moring LLP

(57) ABSTRACT

A sound output by an i-th audio source device is adjusted by an i-th sound leakage reduction filter with a frequency transfer function set in the i-th sound leakage reduction filter and is output from an i-th speaker toward a user. The frequency transfer function relatively reduces the volume of the sound at a frequency where a first gain of a frequency transfer function from the speaker to one or multiple predetermined sound leakage reference positions outside the vehicle tends to be high relative to a second gain of a frequency transfer function from the speaker to the user, and relatively increases the volume of the sound at a frequency where the first gain tends to be low relative to the second gain.

4 Claims, 6 Drawing Sheets

AUDIO SYSTEM AND IN-VEHICLE SYSTEM

RELATED APPLICATION

The present application claims priority to Japanese Patent Application Number 2022-081557, filed May 18, 2022, the entirety of which is hereby incorporated by reference.

BACKGROUND

1. Field of the Disclosure

The present disclosure relates to a technique for suppressing leakage of a sound from an audio system installed in a vehicle to the outside of the vehicle.

2. Description of the Related Art

As a technique for suppressing leakage of a sound from an audio system installed in a vehicle to outside of the vehicle, a technique is known in which an outside-oriented speaker is utilized. The outside-oriented speaker is mounted to output a sound toward the outside of the vehicle. The outside-oriented speaker outputs a sound obtained by inverting a phase of a sound output by an audio system, as a cancellation sound that cancels the sound output by the audio system outside the vehicle (for example, JP 2013-254101 A).

According to this technique for outputting a cancellation sound from the outside-oriented speaker described above, the outside-oriented speaker is required in addition to a speaker included in the audio system.

In addition, according to this technique, since it is possible to suppress leakage of a sound output by the audio system only in the vicinity of the outside-oriented speaker, many outside-oriented speakers are required to suppress leakage of a sound from the audio system to the outside of the vehicle in a wide range of directions.

Therefore, to utilize the above-described technique to sufficiently suppress sound leakage to outside of a vehicle from the audio system, it us unavoidable that the audio system will need to increase in size and complexity.

SUMMARY

Accordingly, it is an objective of the present disclosure to suppress leakage of a sound from an audio system installed in a vehicle to outside of the vehicle with a relatively simple configuration.

To achieve the objective, according to the present disclosure, one form of an audio system installed in a vehicle includes a sound source device, a speaker, and a filter configured to transmit a sound output by the sound source device to the speaker with a set frequency transfer characteristic. The frequency transfer characteristic set in the filter is a frequency transfer function that relatively reduces a volume of the sound at a frequency where a ratio of a gain of a frequency transfer function from the speaker to a reference position that is a predetermined relative position to the vehicle and is outside and near the vehicle with respect to a gain of a frequency transfer function from the speaker to a sound listening position where a target user sitting in a predetermined seat in the vehicle listens to the sound is relatively high, and that relatively increases the volume of the sound at a frequency where the ratio of the gain of the frequency transfer function from the speaker to the reference position with respect to the gain of the frequency transfer function from the speaker to the sound listening position where the target user listens to the sound is relatively low.

In the audio system, the reference position may be a position near the speaker.

In addition, to achieve the objective, according to the present disclosure, a form of an audio system installed in a vehicle includes a sound source device, a speaker, and a filter configured to transmit a sound output by the sound source device to the speaker with a set frequency transfer characteristic. The frequency transfer characteristic set in the filter is a frequency transfer function that relatively reduces a volume of the sound at a frequency where a ratio of a gain of a frequency transfer function from the speaker to a plurality of different reference positions that are predetermined relative positions to the vehicle and are outside and near the vehicle with respect to a gain of a frequency transfer function from the speaker to a sound listening position where a target user sitting in a predetermined seat in the vehicle listens to the sound tends to be relatively high, and that relatively increases the volume of the sound at a frequency where the ratio of the gain of the frequency transfer function from the speaker to the plurality of reference positions with respect to the gain of the frequency transfer function from the speaker to the sound listening position where the target user listens to the sound tends to be relatively low.

In this audio system, when a number of the plurality of reference positions is L, the frequency transfer function from the speaker to the sound listening position where the target user listens to the sound is $C_{11}(f)$, a complex conjugate of $C_{11}(f)$ is $C^*_{11}(f)$, a frequency transfer function from the speaker to the z-th reference position (z is an integer from 1 to L) is $C_{iz}(f)$, and a complex conjugate of $C_{iz}(f)$ is $C^*_{iz}(f)$, the frequency transfer characteristic $W_{11}$ set in the filter may be expressed by:

$$W_{11}(f) = \frac{1}{1 + \sum_{z=1}^{L}(C_{1z}*(f)C_{1z}(f)/C_{11}*(f)C_{11}(f))}.$$

In some implementations, the audio system may further include an adaptive filter whose input is the sound output by the sound source device and whose output is the input of the speaker, a frequency transfer characteristic of the adaptive filter may be obtained as a result of an adaptive operation performed by the adaptive filter using, as an error, a difference between a sound obtained by applying, to the sound output by the sound source device, the same frequency transfer function as the frequency transfer function from the speaker to the sound listening position where the target user listens to the sound and output of a microphone disposed at the sound listening position where the target user listens to the sound, and output of microphones disposed at the plurality of reference positions, and the obtained frequency transfer characteristic of the adaptive filter may be set as the frequency transfer characteristic in the filter.

In some implementations, the audio system may further include an adaptive filter whose input is the sound output by the sound source device and whose output is the input of the speaker, a frequency transfer characteristic of the adaptive filter may be obtained as a result of an adaptive operation performed by the adaptive filter using, as an error, a value obtained by weighing, with a predetermined weight, a difference between a sound obtained by applying, to the sound output by the sound source device, the same frequency transfer function as the frequency transfer function from the speaker to the sound listening position where the target user listens to the sound and output of a microphone disposed at the sound listening position where the target user listens to the sound, and a value obtained by weighing output of each of a plurality of microphones disposed at the plurality of reference positions with a weight set for each of the microphones, and the obtained frequency transfer characteristic of the adaptive filter may be set as the frequency transfer characteristic in the filter.

In addition, to achieve the above-described object, according to the present disclosure, another form of an audio system installed in a vehicle includes a sound source device, a plurality of first to n-th speakers (n is an integer greater than 2), and a plurality of first to n-th filters (n is an integer greater than 2). The i-th filter (i is an integer from 1 to n) transmits a sound output by the sound source device to the i-th speaker with a set frequency transfer characteristic. In addition, the frequency transfer characteristic set in the i-th filter is a frequency transfer function that relatively reduces the volume of the sound at a frequency where a ratio of a gain of a frequency transfer function from the i-th speaker to an i-th reference position that is a predetermined relative position to the vehicle and is outside the vehicle and near the i-th speaker with respect to a gain of a frequency transfer function from the i-th speaker to a sound listening position where a target user sitting in a predetermined seat in the vehicle listens to the sound is relatively high, and that relatively increases the volume of the sound at a frequency where the ratio of the gain of the frequency transfer function from the i-th speaker to the i-th reference position with respect to the gain of the frequency transfer function from the i-th speaker to the sound listening position where the target user listens to the sound is relatively low.

In the audio system, the filters may be graphic equalizers.

In some implementations, a plurality of audio systems as described above may be provided, and a different seat among a plurality of seats in the vehicle may be set as the predetermined seat in each of the audio systems.

According to each of the audio systems, with a configuration including the filter for adjusting, with the set frequency transfer characteristic, the sound output by the sound source device and to be transferred to the speaker, it is possible to suppress leakage of a sound output by the speaker to the outside of the vehicle in a form in which the volume of the sound that has been output from the speaker and to which the user can listen and the quality of the output sound perceived by the user are not reduced as much as possible.

As described above, according to the present disclosure, it is possible to suppress leakage of a sound from an audio system installed in a vehicle to the outside of the vehicle.

DETAILED DESCRIPTION

Hereinafter, embodiments and implementations of the present disclosure are described.

A first embodiment is described below in conjunction with FIGS. 1-5.

Figure 1:
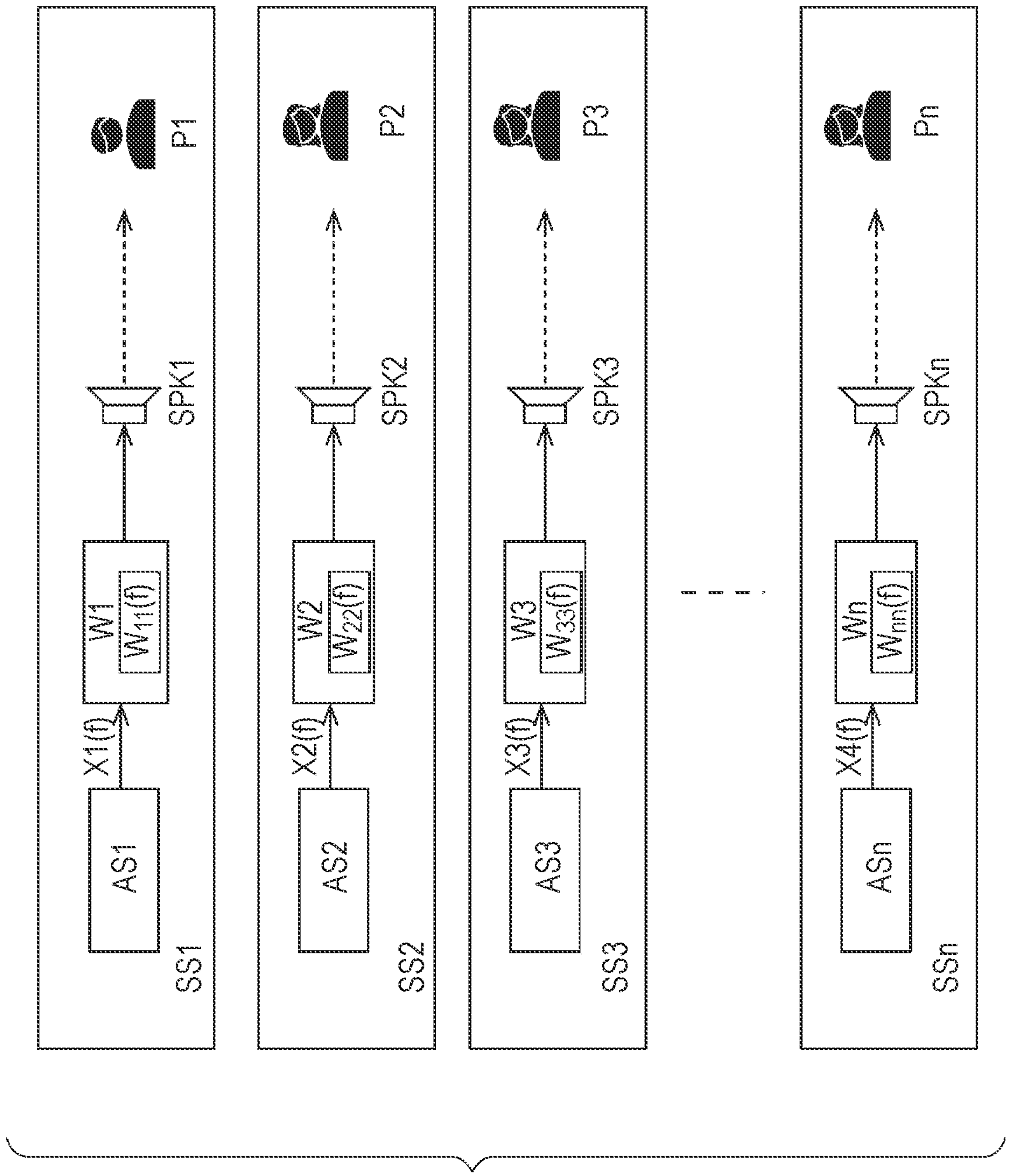
FIG. 1 is a block diagram illustrating a configuration of an audio system according to a first embodiment of the present disclosure.

FIG. 1 illustrates a configuration of an audio system according to the first embodiment.

The audio system is installed in a vehicle and includes a number n of sub-systems SSi. In this case, i is an integer from 1 to n.

The i-th sub-system SSi includes an i-th audio source device ASi, an i-th sound leakage reduction filter Wi, and an i-th speaker SPKi.

The sub-system SSi is a system for an i-th seat in the vehicle. The audio source device ASi outputs a sound to which a user Pi sitting in the i-th seat listens. In the sub-system SSi, a sound Xi(f) output by the audio source device ASi is adjusted by the sound leakage reduction filter Wi with a frequency transfer function $W_{ii}(f)$ set in the sound leakage reduction filter Wi and is output from the speaker SPKi toward the user Pi. The speaker SPKi is disposed near the i-th seat.

A case where n=4, i is an integer from 1 to 4, the first seat of the vehicle is a right front seat of the vehicle, the second seat of the vehicle is a left front seat of the vehicle, the third seat of the vehicle is a right rear seat of the vehicle, and the fourth seat of the vehicle is a left rear seat of the vehicle is described below as an example.

Figure 2:
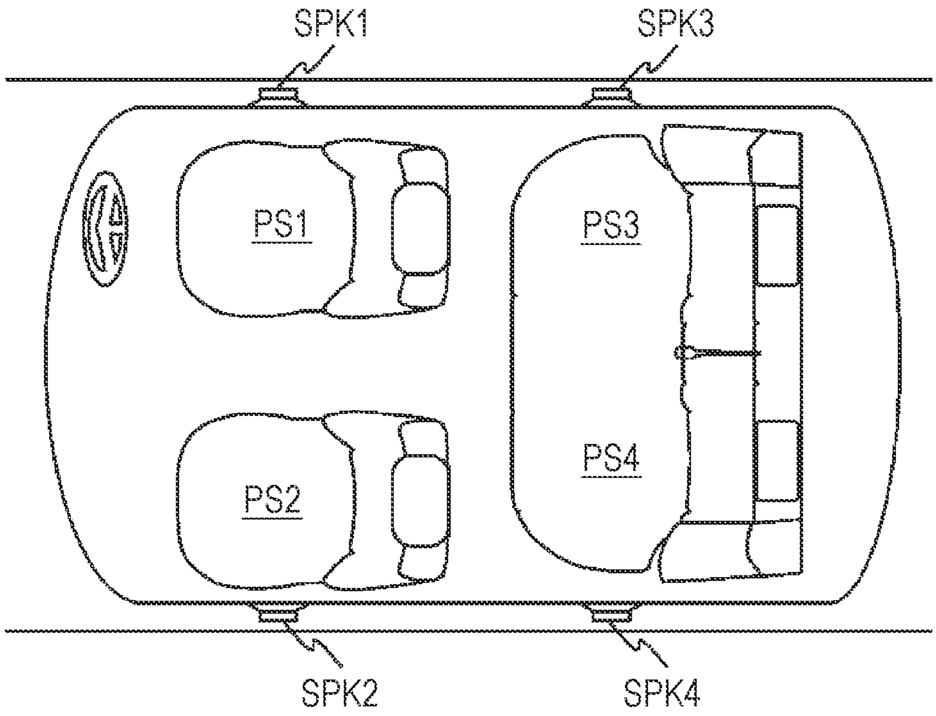
FIG. 2 is a diagram illustrating an example of arrangement of speakers of the audio system according to the first embodiment of the present disclosure.

In this case, as illustrated in FIG. 2, for example, the speaker SPK1 of the sys-system SS1 is disposed at a right front door of the vehicle, the speaker SPK2 of the sub-system SS2 is disposed at a left front door of the vehicle, the speaker SPK3 of the sub-system SS3 is disposed at a right rear door of the vehicle, and the speaker SPK4 of the sub-system SS4 is disposed at a left rear door of the vehicle.

In this case, the frequency transfer function $W_{ii}(f)$ of the sound leakage reduction filter Wi of the i-th sub-system SSi is calculated and set in advance as follows.

For the calculation of the frequency transfer function $W_{ii}(f)$, a number Q (Q>2) of microphones from a microphone MC1 to a microphone MCQ are used. A case in which Q=5 and five microphones from the microphone MC1 to a microphone MC5 are used is described below.

Figure 3A:
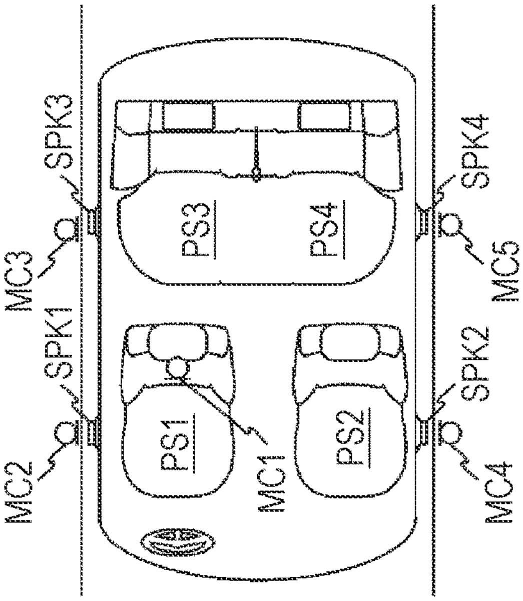
FIGS. 3A to 3D are diagrams illustrating examples of arrangement of microphones in a case where transfer functions of sound leakage reduction filters according to the first embodiment of the present disclosure are learned.

As illustrated in FIG. 3A, to calculate the frequency transfer function $W_{11}(f)$ of the sound leakage reduction filter W1 of the sub-system SS1, the microphone MC1 is disposed at a sound listening position where a user sitting in the right front seat which is the first seat listens to a sound, and the microphone MC2, the microphone MC3, the microphone MC4, and the microphone MC5 are disposed at predetermined sound leakage reference positions outside the vehicle. In this case, it is assumed that the sound leakage reference positions are four positions near the speaker SPK1, the speaker SPK2, the speaker SPK3, and the speaker SPK4 and outside the vehicle.

Figure 3B:
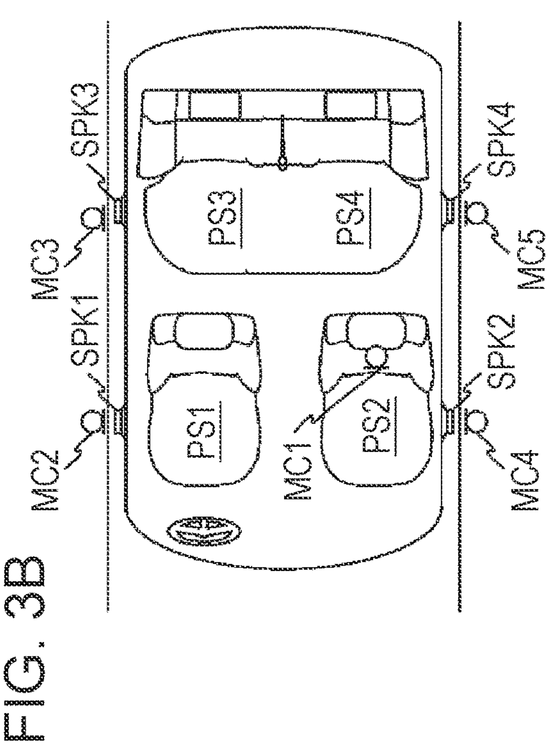

In addition, as illustrated in FIG. 3B, to calculate a frequency transfer function $W_{22}(f)$ of the sound leakage reduction filter W2 of the sub-system SS2, the microphones MC2, MC3, MC4, and MC5 are arranged in the same manner as the arrangement illustrated in FIG. 3A, and the microphone MC1 is disposed at a sound listening position where a user sitting in the left front seat which is the second seat listens to a sound.

Figure 3C:
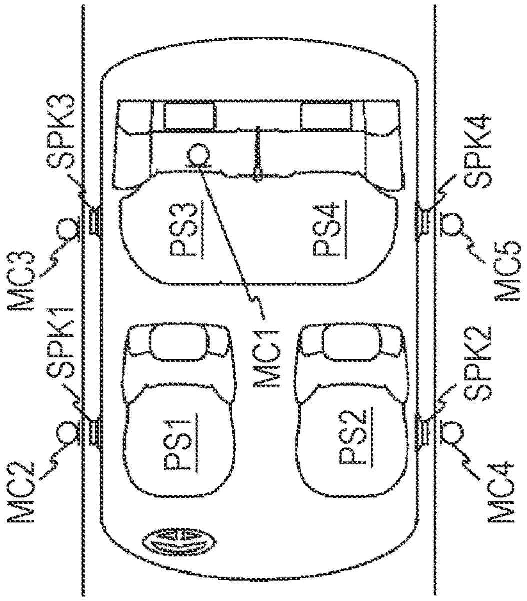

In addition, as illustrated in FIG. 3C, to calculate a frequency transfer function $W_{33}(f)$ of the sound leakage reduction filter W3 of the sub-system SS3, the microphones MC2, MC3, MC4, and MC5 are arranged in the same manner as the arrangement illustrated in FIG. 3A, and the microphone MC1 is disposed at a sound listening position where a user sitting in the right rear seat which is the third seat listens to a sound.

Figure 3D:
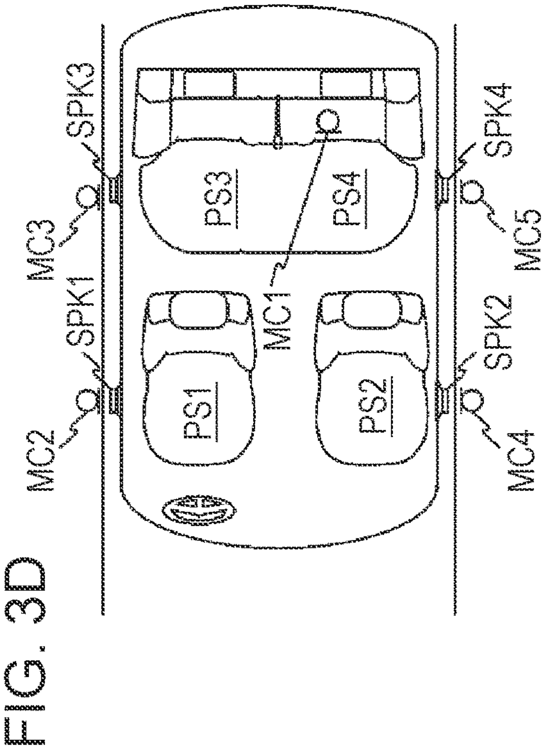

In addition, as illustrated in FIG. 3D, to calculate a frequency transfer function $W_{44}(f)$ of the sound leakage reduction filter W4 of the sub-system SS4, the microphones MC2, MC3, MC4, and MC5 are arranged in the same manner as the arrangement illustrated in FIG. 3A, and the microphone MC1 is disposed at a sound listening position where a user sitting in the left rear seat which is the fourth seat listens to a sound.

Figure 4:
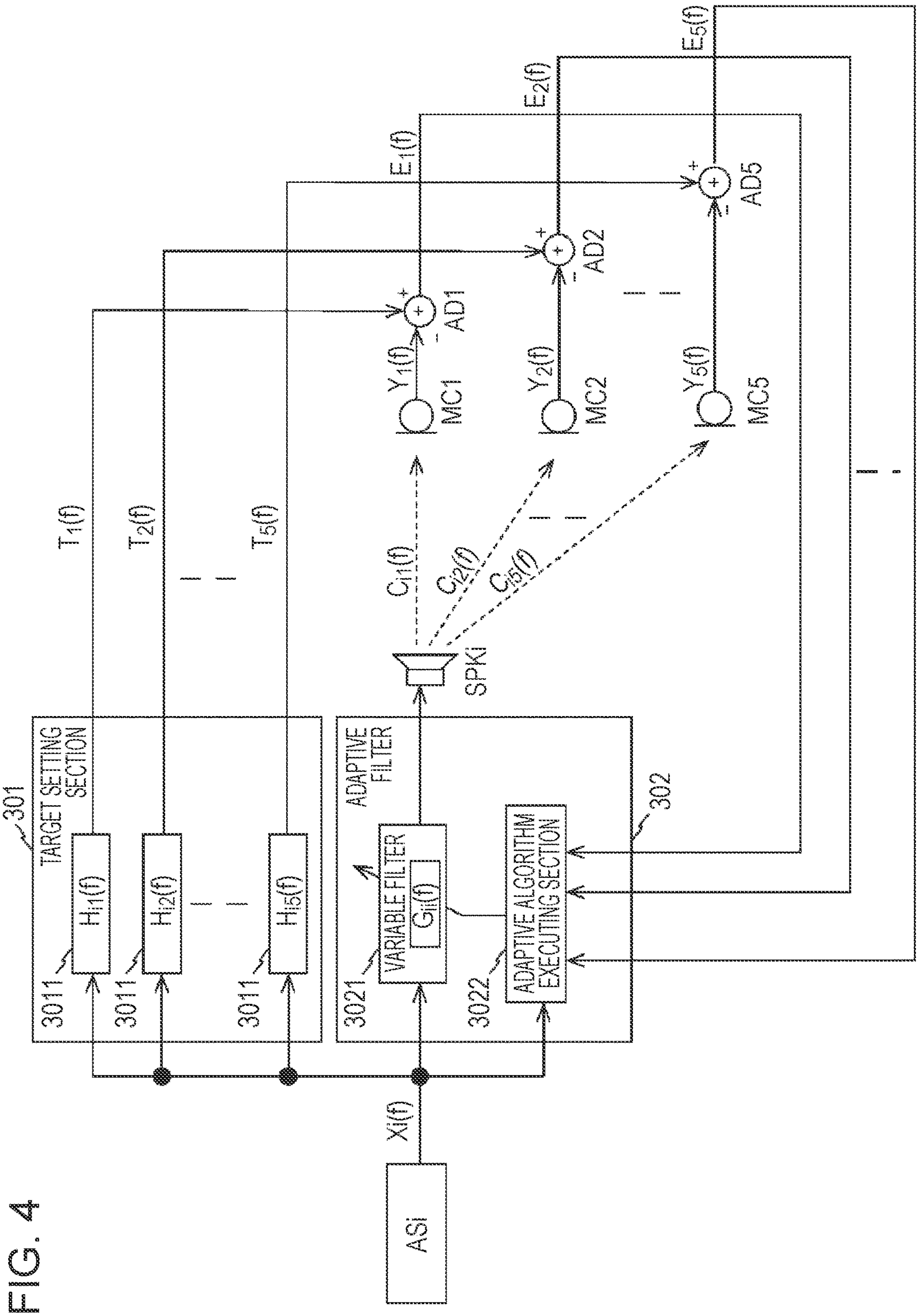
FIG. 4 is a diagram illustrating a configuration for learning the transfer functions of the sound leakage reduction filters according to the first embodiment of the present disclosure.

Then, the frequency transfer function $W_{ii}(f)$ of the sound leakage reduction filter Wi of the i-th sub-system SSi is calculated by a configuration illustrated in FIG. 4.

As illustrated in FIG. 4, this configuration includes an audio source device ASi, a target setting section 301, an adaptive filter 302, a speaker SPKi, the five microphones MC1 to MC5 described above, and five subtractors AD1 to AD5.

The target setting section 301 includes five filters 3011 that receive the output Xi(f) of the audio source device ASi. In the i-th filter 3011, a target frequency transfer function $H_{ij}(f)$ from the speaker SPKi to the j-th microphone MCj (j is an integer from 1 to 5) is set.

The adaptive filter 302 includes a variable filter 3021 that receives the output Xi(f) of the audio source device AS1, and an adaptive algorithm executing section 3022. The output of the variable filter 3021 is output from the speaker SPKi.

The j-th subtractor ADj subtracts output $Y_j(f)$ of the j-th microphone MCj from output $T_j(f)$ of the j-th filter 3011 having the frequency transfer function $H_{ij}(f)$ set therein and outputs the result of the subtraction as a j-th error $E_j(f)$ to the adaptive filter 302.

The adaptive algorithm executing section 3022 of the adaptive filter 302 executes a predetermined adaptive algorithm such as a multiple error filtered-X least mean square (MEFXLSM) algorithm and performs an adaptive operation of updating a frequency transfer characteristic $G_{ii}$ of the variable filter 3021 so as to minimize five errors $E_1(f)$ to $E_5(f)$ output from the five subtractors AD1 to AD5 as a whole.

In this configuration, while the audio source device ASi outputs a sound Xi(f), the adaptive algorithm executing section 3022 performs the adaptive operation. When the frequency transfer characteristic $G_{ii}$ of the variable filter 3021 converges, the frequency transfer characteristic $G_{ii}$ that has converged is set as the frequency transfer function $W_{ii}(f)$ in the sound leakage reduction filter Wi of the sub-system SSi.

In the first filter 3011 of the target setting section 301, a target frequency transfer function from the speaker SPKi to a user Pi is set as a frequency transfer function $H_{i1}(f)$, and frequency transfer functions $H_{i2}$ to $H_{i5}$ of the second to fifth filters 3011 of the target setting section 301 are set to have a gain of 0 at all frequencies.

In this case, an actual frequency transfer function from the speaker SPKi to the j-th microphone MCj is represented by $C_{ij}$, and the frequency transfer function $W_{ii}(f)$ is calculated according to Equation (1), where A* is a complex conjugate of A.

$$W_{ii}(f) = \frac{1}{1 + \sum_{m=2}^{5} (C_{im} * (f) C_{im}(f) / C_{i1} * (f) C_{i1}(f))} \quad \text{(Equation 1)}$$

According to the frequency transfer function $W_{ii}(f)$ calculated in the above-described manner and set in the sound leakage reduction filter Wi of the sub-system SSi, the sound leakage reduction filter Wi adjusts a sound to relatively reduce the volume of the sound at a frequency where gains of frequency transfer functions indicated by $C_{im}(f)$ (m is an integer from 2 to 5) from the speaker SPKi to the sound leakage reference positions (microphones MC2 to MC5) tend to be high relative to a gain of a frequency transfer function indicated by $C_{i1}(f)$ from the speaker SPKi to the user Pi (microphone MC1), and to relatively increase the volume of the sound at a frequency where the gains of the frequency transfer functions indicated by $C_{im}(f)$ from the speakers SPKi to the sound leakage reference positions (microphones MC2 to MC5) tend to be low relative to the gain of the frequency transfer function indicated by $C_{i1}(f)$ from the speaker SPKi to the user Pi (microphone MC1).

As a result, it is possible to efficiently suppress sound leakage in a form in which the volume of a sound that has been output by the speaker SPKi and to which the i-th user Pi can listen and the quality of the output sound perceived by the user Pi are not reduced as much as possible.

Figure 5:
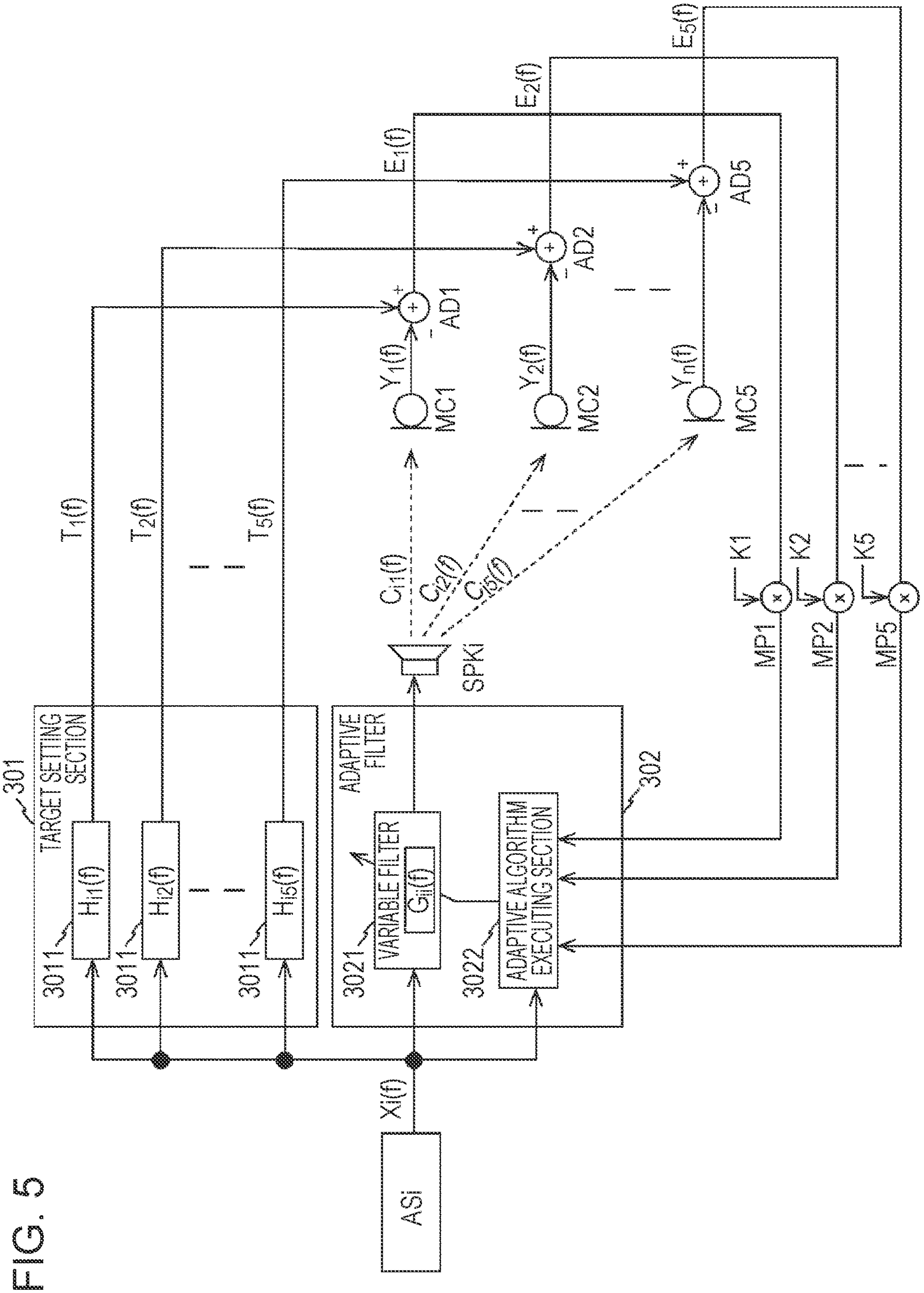
FIG. 5 is a diagram illustrating another example of the configuration for learning the transfer functions of the sound leakage reduction filters according to the first embodiment of the present disclosure.

As illustrated in FIG. 5, to calculate the frequency transfer function $W_{ii}(f)$ of the sound leakage reduction filter Wi of the i-th sub-system SSI, multipliers MP1 to MP5 may be provided, and a multiplier MPj among the multipliers MP1 to MP5 may multiply an error $E_j(f)$ output by the subtractor ADj by a weight Kj and output the result of the multiplication to the adaptive filter 302.

In addition, in a case where m is an integer from 2 to 5 as described above, m that maximizes $C_{im}*(f)\cdot C_{im}(f)/C_{i1}*(f)\cdot C_{i1}(f)$ may be d, a weight Km for an error $E_m(f)$ other than an error $E_d(f)$ may be 0, and weights Kd and K1 for the errors $E_d(f)$ and $E_1(f)$ may be 1. In this case, the frequency transfer function $W_{ii}(f)$ set in the sound leakage reduction filter Wi is expressed according to Equation (2).

$$W_{i1}(f) = \frac{1}{1 + (C_{id} * (f) C_{id}(f) / C_{i1} * (f) C_{i1}(f))} \quad \text{(Equation 2)}$$

In a case where the microphones MCj are arranged as illustrated in FIGS. 3A to 3D, since it is expected that $C_{im}(f)$ that maximizes $C_{im}*(f)\cdot C_{im}(f)/C_{i1}*(f)\cdot C_{i1}(f)$ is a frequency transfer function $C_{i(i+1)}$ from the speaker SPKi to the i+1-th microphone MC(i+1) closest to the speaker SPKi, d may be equal to i+1, the weight Km for the error $E_m(f)$ other than the error $E_d(f)$ may be 0, and the weights Kd and K1 for the errors $E_d(f)$ and $E_1(f)$ may be 1 without any requirement.

Alternatively, a microphone disposed at a sound leakage reference position where sound leakage is to be most suppressed among the sound leakage reference positions may be set as a microphone MCR, d may be equal to R, the weight Km for the error $E_m(f)$ other than the error $E_d(f)$ may be 0, and the weights Kd and K1 for the errors $E_d(f)$ and $E_1(f)$ may be 1.

In this case, it is possible to most efficiently reduce the volume of a sound output by the speaker SPKi to a sound leakage reference position where the volume of a sound output by the speaker SPKi and leaking to the outside of the vehicle is the highest or to a sound leakage reference position where sound leakage is to be most suppressed. In addition, it is possible to reduce the amount of processing for performing the adaptive operation by the adaptive algorithm executing section 3022. It is necessary to perform the adaptive operation in order to calculate the frequency transfer function Wu(f).

A second embodiment of the present disclosure is described below in conjunction with FIG. 6.

Figure 6:
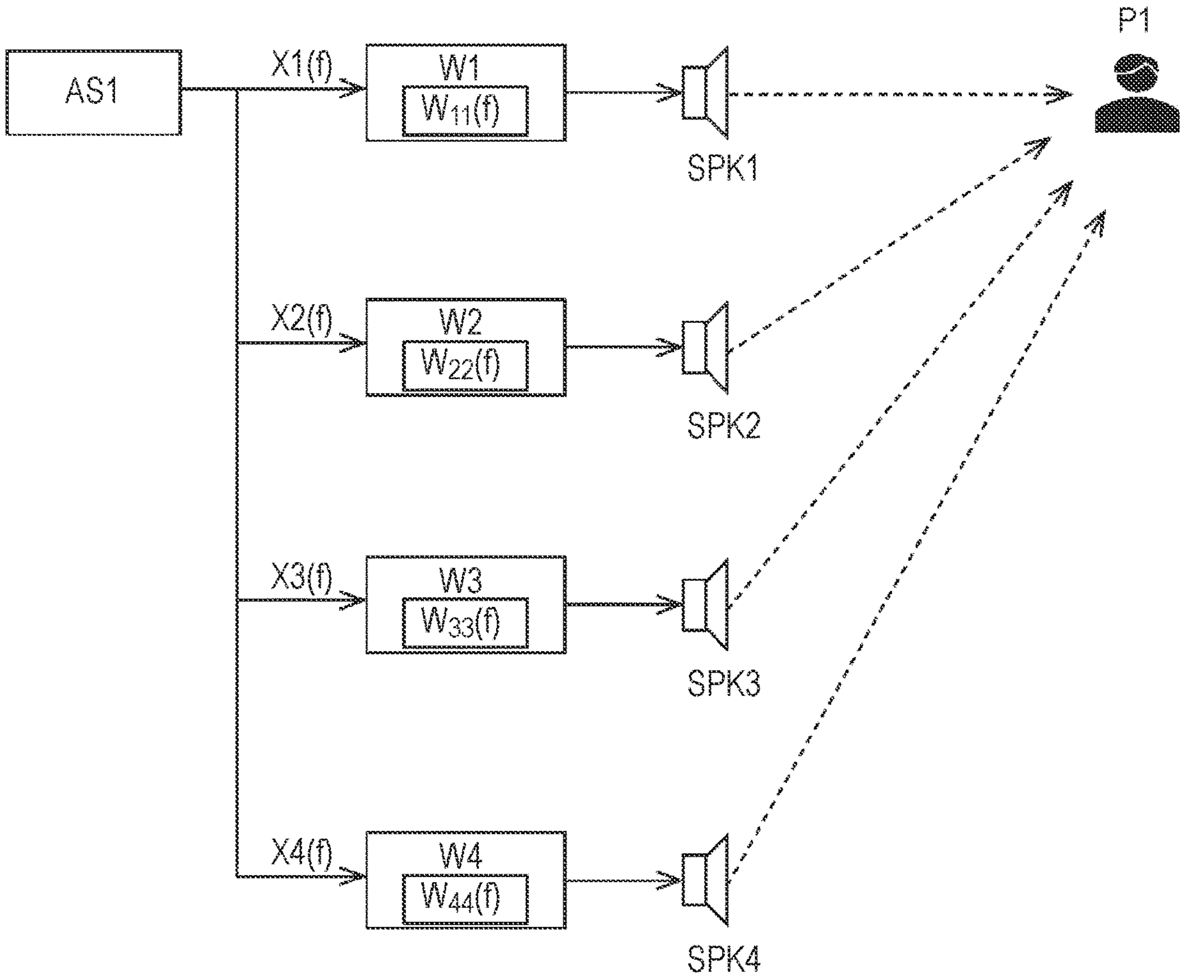
FIG. 6 is a block diagram illustrating a configuration of an audio system according to a second embodiment of the present disclosure.

FIG. 6 illustrates a configuration of an audio system according to the second embodiment.

In the audio system according to the second embodiment, all speakers SPKi are used for a user P1 sitting in the left front seat that is the first seat, unlike the first embodiment.

As illustrated in FIG. 6, the audio system includes a single audio source device AS1, four sound leakage reduction filters Wi, and the four speakers SPKi. In this case, i is an integer from 1 to 4.

A sound Xi(f) output for the speaker SPKi by the audio source device AS1 is adjusted by the sound leakage reduction filter Wi with a frequency transfer function $W_{ii}(f)$ set in the sound leakage reduction filter Wi and is output from the speaker SPKi.

The frequency transfer function $W_{ii}(f)$ of the sound leakage reduction filter Wi is calculated and set in advance.

The frequency transfer function $W_{ii}(f)$ of the sound leakage reduction filter Wi is calculated in a configuration obtained by arranging microphones MC1 to MC5 as illustrated in FIG. 3A and replacing the audio source device ASi with the audio source device AS1 in the configuration illustrated in FIG. 4 or FIG. 5.

To calculate the frequency transfer function $W_{ii}(f)$ of the i-th sound leakage reduction filter Wi, the speakers other than the i-th speaker SPKi are stopped outputting a sound.

In addition, to calculate the frequency transfer function $W_{ii}(f)$ in the configuration in which the audio source device ASi is replaced with the audio source device AS1 in FIG. 5, d may be equal to i+1, a weight Km for an error $E_m(f)$ other than an error $E_d(f)$ may be 0, and weights Kd and K1 for errors $E_d(f)$ and $E_1(f)$ may be 1 without any requirement as described above.

As described above, the frequency transfer functions $W_{ii}(f)$ of the four sound leakage reduction filters Wi are independently calculated and thus the four sound leakage reduction filters Wi have different characteristics. Therefore, it can be expected that sounds adjusted using the different characteristics of the four sound leakage reduction filters Wi and output by the four speakers SPKi complement each other so as to suppress a reduction in the quality of a sound output by the audio source device AS1 and heard by the user P1.

Embodiments of the present disclosure are described above.

Since the effect of each of the sound leakage reduction filters Wi described in each of the embodiments is to adjust a gain at each frequency of a sound Xi(f) output by each of the audio source devices, a graphic equalizer that adjusts a gain in each frequency band such as each ⅓ octave band may be used as each of the sound leakage reduction filters Wi.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. An audio system installed in a vehicle, the audio system comprising:

a sound source device;

a speaker; and a filter configured to transmit a sound signal output by the sound source device to the speaker with a set frequency transfer characteristic;

wherein the frequency transfer characteristic set in the filter is a frequency transfer function that reduces a volume of the sound at a frequency where a ratio of a gain of a frequency transfer function from the speaker to a plurality of different reference positions that are predetermined relative positions to the vehicle and are outside the vehicle with respect to a gain of a frequency transfer function from the speaker to a sound listening position where a target user sitting in a predetermined seat in the vehicle listens to the sound is high, and that increases the volume of the sound at a frequency where the ratio of the gain of the frequency transfer function from the speaker to the plurality of reference positions with respect to the gain of the frequency transfer function from the speaker to the sound listening position where the target user listens to the sound is low; and wherein when a number of the reference positions of the plurality of different reference positions is L, the frequency transfer function from the speaker to the sound listening position where the target user listens to the sound is $C_{11}(f)$, a complex conjugate of $C_{11}(f)$ is $C^*_{11}(f)$, a frequency transfer function from the speaker to the z-th reference position is $C_{iz}(f)$, z is an integer from 1 to L, and a complex conjugate of $C_{iz}(f)$ is $C^*_{iz}(f)$, and the frequency transfer characteristic $W_{11}$ set in the filter is expressed by:

$$W_{11}(f) = \frac{1}{1 + \sum_{z=1}^{L} (C_{1z} * (f) C_{1z}(f) / C_{11} * (f) C_{11}(f))}.$$

2. An audio system installed in a vehicle, the audio system comprising:

a sound source device;

a speaker; and a filter configured to transmit a sound signal output by the sound source device to the speaker with a set frequency transfer characteristic;

wherein the frequency transfer characteristic set in the filter is a frequency transfer function that reduces a volume of the sound at a frequency where a ratio of a gain of a frequency transfer function from the speaker to a plurality of different reference positions that are predetermined relative positions to the vehicle and are outside the vehicle with respect to a gain of a frequency transfer function from the speaker to a sound listening position where a target user sitting in a predetermined seat in the vehicle listens to the sound is high, and that increases the volume of the sound at a frequency where the ratio of the gain of the frequency transfer function from the speaker to the plurality of reference positions with respect to the gain of the frequency transfer function from the speaker to the sound listening position where the target user listens to the sound is low;

wherein the audio system further comprises an adaptive filter whose input is the sound signal output by the sound source device and whose output is an input of the speaker; and wherein a frequency transfer characteristic of the adaptive filter is obtained as a result of an adaptive operation performed by the adaptive filter using, as an error, a difference between a sound obtained by applying, to the sound signal output by the sound source device, the same frequency transfer function as the frequency transfer function from the speaker to the sound listening position where the target user listens to the sound and output of a microphone disposed at the sound listening position where the target user listens to the sound, and output of microphones disposed at the plurality of reference positions, and the obtained frequency transfer characteristic of the adaptive filter is set as the frequency transfer characteristic in the filter.

3. An audio system installed in a vehicle, the audio system comprising:

a sound source device;

a speaker; and a filter configured to transmit a sound signal output by the sound source device to the speaker with a set frequency transfer characteristic;

wherein the frequency transfer characteristic set in the filter is a frequency transfer function that reduces a volume of the sound at a frequency where a ratio of a gain of a frequency transfer function from the speaker to a plurality of different reference positions that are predetermined relative positions to the vehicle and are outside the vehicle with respect to a gain of a frequency transfer function from the speaker to a sound listening position where a target user sitting in a predetermined seat in the vehicle listens to the sound is high, and that increases the volume of the sound at a frequency where the ratio of the gain of the frequency transfer function from the speaker to the plurality of reference positions with respect to the gain of the frequency transfer function from the speaker to the sound listening position where the target user listens to the sound is low;

wherein the audio system further comprises an adaptive filter whose input is the sound signal output by the sound source device and whose output is an input of the speaker; and wherein a frequency transfer characteristic of the adaptive filter is obtained as a result of an adaptive operation performed by the adaptive filter using, as an error, a value obtained by weighing, with a predetermined weight, a difference between a sound obtained by applying, to the sound signal output by the sound source device, the same frequency transfer function as the frequency transfer function from the speaker to the sound listening position where the target user listens to the sound and output of a microphone disposed at the sound listening position where the target user listens to the sound, and a value obtained by weighing output of each of a plurality of microphones disposed at the plurality of reference positions with a weight set for each of the microphones, and the obtained frequency transfer characteristic of the adaptive filter is set as the frequency transfer characteristic in the filter.

4. An in-vehicle system comprising a plurality of the audio systems according to claim 3, wherein:

in each audio system of the plurality of the audio systems, a different seat among a plurality of seats in the vehicle is set as the predetermined seat.

* * * * *